(12) United States Patent
Chen et al.

(10) Patent No.: US 7,253,593 B1
(45) Date of Patent: Aug. 7, 2007

(54) DC-DC CONVERTER AND ERROR AMPLIFIER THEREOF

(75) Inventors: Ke-Horng Chen, Taipei County (TW); Li-Ren Huang, Taipei County (TW); Hong-Wei Huang, Taichung County (TW); Sy-Yen Kuo, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/606,926

(22) Filed: Dec. 1, 2006

(30) Foreign Application Priority Data

Aug. 1, 2006 (TW) .............................. 95128125 A (51) Int. Cl.
*G05F 1/613* (2006.01)
(52) U.S. Cl. ..................................... 323/224; 323/283
(58) Field of Classification Search ................ 323/224, 323/283, 284
See application file for complete search history.

(56) References Cited

U.S. PATENT DOCUMENTS 5,481,178 A * 1/1996 Wilcox et al. .............. 323/287
5,912,552 A * 6/1999 Tateishi ...................... 323/285
6,064,187 A * 5/2000 Redl et al. .................. 323/285
6,229,292 B1 * 5/2001 Redl et al. .................. 323/285
6,894,471 B2 * 5/2005 Corva et al. ................ 323/282
6,909,268 B2 * 6/2005 Taghizadeh-Kaschani .. 323/284

* cited by examiner

*Primary Examiner*—Shawn Riley
(74) *Attorney, Agent, or Firm*—Birch, Stewart, Kolasch & Birch, LLP (57) ABSTRACT

A DC-DC converter includes an error amplifier that includes an operational transconductance amplifier (OTA), a compensation circuit, and a fast transient controller. The OTA includes a compensation resistor, a compensation capacitor of $C_z$, and a Miller circuit. The equalization capacitance generated by the compensation capacitor and the Miller circuit is $(1+k) C_z$. The Miller circuit includes three transistors operated in the triode region. The ratio of the current through the transistors is $1:mk:(1-m)k$. The current through the compensation capacitor in a second mode is $(1+mk)$ times that in a first mode. The fast transient controller switches the Miller circuit between the first and second modes according to a feedback voltage dependent on the output voltage of the DC-DC converter.

12 Claims, 8 Drawing Sheets

DC-DC CONVERTER AND ERROR AMPLIFIER THEREOF

BACKGROUND OF THE INVENTION

1. Field of the Invention

The invention relates to DC-DC converters and error amplifiers thereof.

2. Description of the Related Art

Portable electronic devices, such as mobile phones, personal digital assistants, and portable multimedia entertainment players, are powered by batteries. A DC-DC converter is required to convert the battery voltage to the required voltage level.

The DC-DC converter comprises an error amplifier, which requires a large compensation capacitor. The compensation capacitor, however, limits the response time of the error amplifier and the stabilization time of the DC-DC converter. The compensation capacitor is too large to be integrated in a chip, and thus connecting wires between the external compensation capacitor and the chips resultingly act as parasitic capacitors and resistors.

In another conventional DC-DC converter, the compensation capacitor is charged or discharged by a large current provided by the error amplifier to speed response of the error amplifier. However, the large charge/discharge current results in more power consumption.

An error amplifier with fast response and low power consumption is thus called for.

BRIEF SUMMARY OF THE INVENTION

The invention provides novel error amplifiers with fast response and low power consumption. The compensation capacitor required by the error amplifier is low and can be integrated in a chip. Utilizing the error amplifier, the invention provides DC-DC converters having fast stabilization.

An exemplary embodiment of the error amplifier comprises an operational transconductance amplifier (OTA), a compensation circuit, and a fast transient controller. The OTA generates a first current according to the voltage difference between a reference voltage and a feedback voltage. The compensation circuit comprises a compensation resistor, a compensation capacitor, and a Miller circuit. The first terminal of the compensation resistor is coupled to the output terminal of the OTA. The first and second terminals of the Miller circuit are coupled to the second terminal of the compensation resistor and the first terminal of the compensation capacitor, respectively. The capacitance of the compensation capacitor is $C_z$. The equivalent capacitance generated by the Miller circuit and the compensation capacitance is $(1+k)C_z$. k is a positive constant value determined by the Miller circuit. The compensation capacitor is charged or discharged by a second current. The Miller circuit can be operated in a first mode or a second mode. The second current in the second mode is $(1+mk)$ times that in the first mode. m is a positive decimal fraction determined by the Miller circuit. When the feedback voltage exceeds a high voltage level or below a low voltage level, the fast transient controller switches the Miller circuit from the first mode to the second mode. Otherwise the Miller circuit is set in the first mode.

The Miller circuit comprises a first transistor, a second transistor, a third transistor, a first switch, a second switch, and a voltage follower. The first, second and third transistors are operated in a triode region. The first terminals of the first, second and third transistors are all coupled to the second terminal of the compensation resistor. The first and second terminals of the first switch are coupled to the second terminal of the first transistor and the second terminal of the second transistor, respectively. The first and second terminals of the second switch are coupled to the second terminal of the second transistor and the second terminal of the third transistor, respectively. The first terminal of the voltage follower is coupled to the first terminal of the first switch and the first terminal of the compensation capacitor. The second terminal of the voltage follower is coupled to the second terminal of the second switch. The first and second terminals of the voltage follower are kept at the same voltage level. The ratio of the current through the first, second and third transistors is $1:mk:(1-m)k$. When the Miller circuit is operated in the first mode, the first switch is switched off and second switch is switched on. When the Miller circuit is operated in the second mode, the first switch is switched on and the second switch is switched off.

In another exemplary embodiment, the first, the second and third transistors are replaced by resisters.

The fast transient controller further comprises a first comparator, a second comparator, a first single pulse generator, and a second single pulse generator. When the first comparator detects that the feedback voltage exceeds the high voltage level, the first single pulse generator generates a single pulse to switch on the first switch and switch off the second switch. When the second comparator detects that the feedback voltage is below the low voltage level, the second single pulse generator generates a single pulse to switch on the first switch and switch off the second switch. Otherwise the first switch is set to off and the second switch is set to on to maintain the Miller circuit operated in the first mode.

The first and second pulse generators each comprise a CMOS inverter, a capacitor, a comparator, and a AND logic gate. The input terminal of the CMOS inverter is coupled to the input terminal of the AND logic gate. The capacitor is coupled to the non-inverting input terminal of the comparator and is charged or discharged via the output terminal of the CMOS inverter. The output terminal of the comparator is coupled to another input terminal of the AND logic gate. When the input of the CMOS inverter is at logic 1 and the voltage level across the capacitor is larger than that of the inverting input terminal of the comparator, the AND logic gate outputs a logic 1 for a period to generate the single pulse.

In another exemplary embodiment, the DC-DC converter of the invention comprises a DC voltage source, an output capacitor, an error amplifier of the invention, a pulse generator, and a power stage circuit. The output capacitor is coupled to the output terminal of the DC-DC converter. The feedback voltage, coupled to the input terminal of the OTA of the error amplifier, is dependent on the output voltage of the DC-DC converter. The pulse generator generates a pulse signal according to the voltage level of the output terminal of the OTA. The power stage circuit is coupled to the DC voltage source and the output capacitor, and charges/discharges the output capacitor according to the pulse signal to maintain the output voltage level of the DC-DC converter at a stable value.

The DC-DC converter further comprises a first voltage-dividing resistor $R_1$ and a second voltage-dividing resistor $R_2$. $V_{out}$ is the output voltage of the DC-DC converter. $\Delta V_{out\text{-}max}$ is the maximum variation of $V_{out}$. The feedback voltage $$V_{fb} \text{ is } \frac{R_2}{R_1+R_2} \cdot V_{out}.$$

When the variation of $V_{out}$ exceeds a threshold voltage of $V_{hys}$, the Miller circuit switches from the first mode to the second mode. The Miller circuit is be maintained in the second mode with a period of $T_{one-shot}$, where $$T_{one-shot} = \frac{2C_Z \Delta V_{control}(R_1 + R_2)}{g_{m,n}(1+mk) \cdot (\Delta V_{out-max} + V_{hys})R_2}.$$

In the first mode, the second current and the voltage difference between $V_{hys}$ and $V_{fb}$ generates a transconductance of $g_{m,n}$. The variation of the output voltage of the OTA during the second mode is $\Delta V_{control}$.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
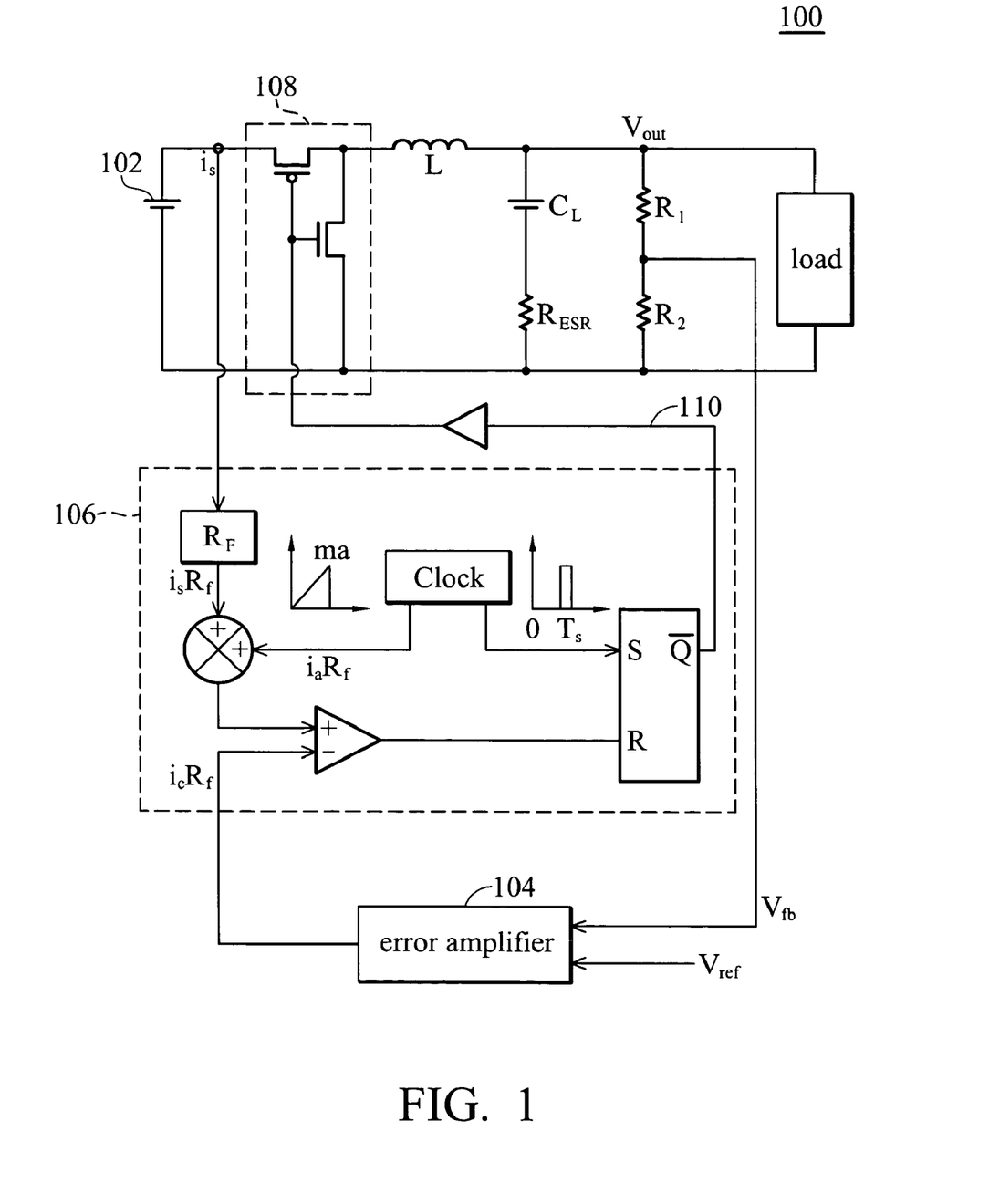
FIG. 1 shows a DC-DC converter of the invention.

FIG. 1 shows a DC-DC converter of the invention. The DC-DC converter 100 comprises a DC voltage source 102, an output capacitor $C_L$, an error amplifier 104, a pulse generator 106 (such as a PWM), and a power stage circuit 108. The DC-DC converter converts the output voltage of the DC voltage source 102 to a voltage level suitable for portable electronic devices. The output voltage of the DC-DC converter 100 is $V_{out}$. When the load of the DC-DC converter requires more current, the electrical charge of the output capacitor $C_L$ is injected into the load. The output voltage $V_{out}$, therefore, decreases. The output of the error amplifier 104 varies with the voltage difference between a reference voltage $V_{ref}$ and a feedback voltage $V_{fb}$ $$\left(V_{fb} = \frac{R_2}{R_1 + R_2} \cdot V_{out}\right).$$

The duty cycle of a pulse signal generated by the pulse generator 106 is determined by a current is detected from the DC-DC converter 100 and the output of the error amplifier 104. The power stage circuit 108 comprises two switches, one coupled to the positive terminal of the DC voltage source 102, and the other coupled to the negative terminal of the DC voltage source 102. According to the pulse signal 110, the power stage circuit 108 charges the output capacitor $C_L$ to stabilize the output voltage $V_{out}$.

Figure 2:
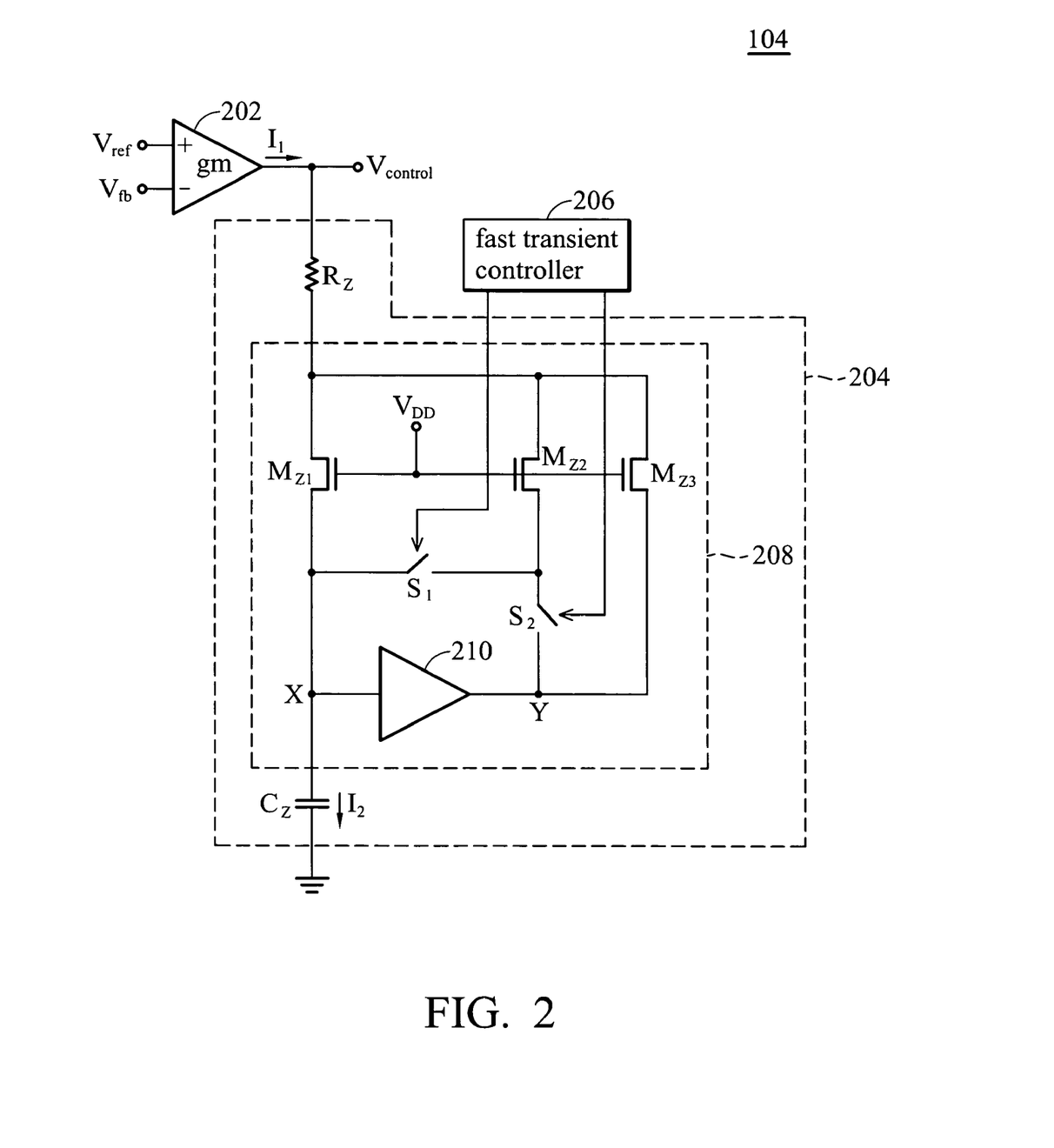
FIG. 2 shows an embodiment of a error amplifier of the invention.

FIG. 2 shows an embodiment of the error amplifier of the invention. The error amplifier 104 comprises an operational transconductance amplifier (OTA) 202, a compensation circuit 204, and a fast transient controller 206. The transconductance of the OTA 202 is $g_m$. According to the voltage difference between the reference voltage $V_{ref}$ and the feedback voltage $V_{fb}$, the OTA 202 generates a first current $I_1$. The compensation circuit 204 comprises a compensation resistor $R_z$, a compensation capacitor $C_z$, and a Miller circuit 208. The Miller circuit 208 generates a second current $I_2$ to charge/discharge the compensation capacitor $C_z$. The Miller circuit 208 comprises a first transistor $M_{z1}$, a second transistor $M_{z2}$, a third transistor $M_{z3}$, a first switch $S_1$, a second switch $S_2$, and a voltage follower 210. The gates of the transistors $M_{z1}$, $M_{z2}$ and $M_{z3}$ are coupled to a voltage source $V_{DD}$ to operate in the triode region as resistors. The input terminal X and the output terminal Y of the voltage follower 210 have the same voltage value. The ratio of current through the transistors $M_{z1}$, $M_{z2}$ and $M_{z3}$ is 1:mk:(1−m)k. k is a positive constant. M is a positive decimal fraction. The Miller circuit 208 and the compensation capacitor $C_z$ are coupled together to generate a equivalent capacitance of $(1+k)C_z$. The compensation capacitor $C_z$, therefore, is relatively small compared to that required by conventional error amplifiers. The small compensation capacitor $C_z$ can be integrated into a chip to replace the large exclusive compensation capacitor for conventional error amplifiers. The Miller circuit 208 can be operated in a first mode and a second mode. When the feedback voltage $V_{fb}$ exceeds a high voltage level $V_H$ or falls below low voltage level $V_L$, the fast transient controller 206 switches the Miller circuit 208 from the first mode to the second mode. Otherwise the Miller circuit 208 is set in the first mode. In the first mode, the first switch $S_1$ is off and the second switch $S_2$ is on. The second current $I_2$ is through the first transistor $M_{z1}$. In the second mode, the first switch $S_1$ is on and the second switch $S_2$ is off. The second current $I_2$ is the sum of the current through the first transistor $M_{z1}$ and the current through the second transistor $M_{z2}$. The second current $I_2$ in the second mode is (1+mk) times that in the first mode. In the second mode, the compensation capacitor $C_z$ is charged/discharged by large current and therefore the response of the error amplifier 104 is improved.

Under the same fabrication process, the channel width-length ratios (W/L) of the transistors $M_{z1}$, $M_{z2}$ and $M_{z3}$ determine the value of m and k. The ratio of $(W/L)_{z1}$ to $(W/L)_{z2-3}$ is 1:k. The ratio of $(W/L)_{z2}$ to $(W/L)_{z3}$ is m:(1−m). $(W/L)_{z1}$ is the channel width-length ratio of the first transistor $M_{z1}$. $(W/L)_{z2-3}$ is the channel width-length ratio of the parallel coupled transistors $M_{z2}$ and $M_{z3}$. $(W/L)_{z3}$ is the channel width-length ratio of the third transistor $M_{z3}$. In another exemplary embodiment, the transistors $M_{z1}$, $M_{z2}$ and $M_{z3}$ can be replaced by resistors.

Figure 3:
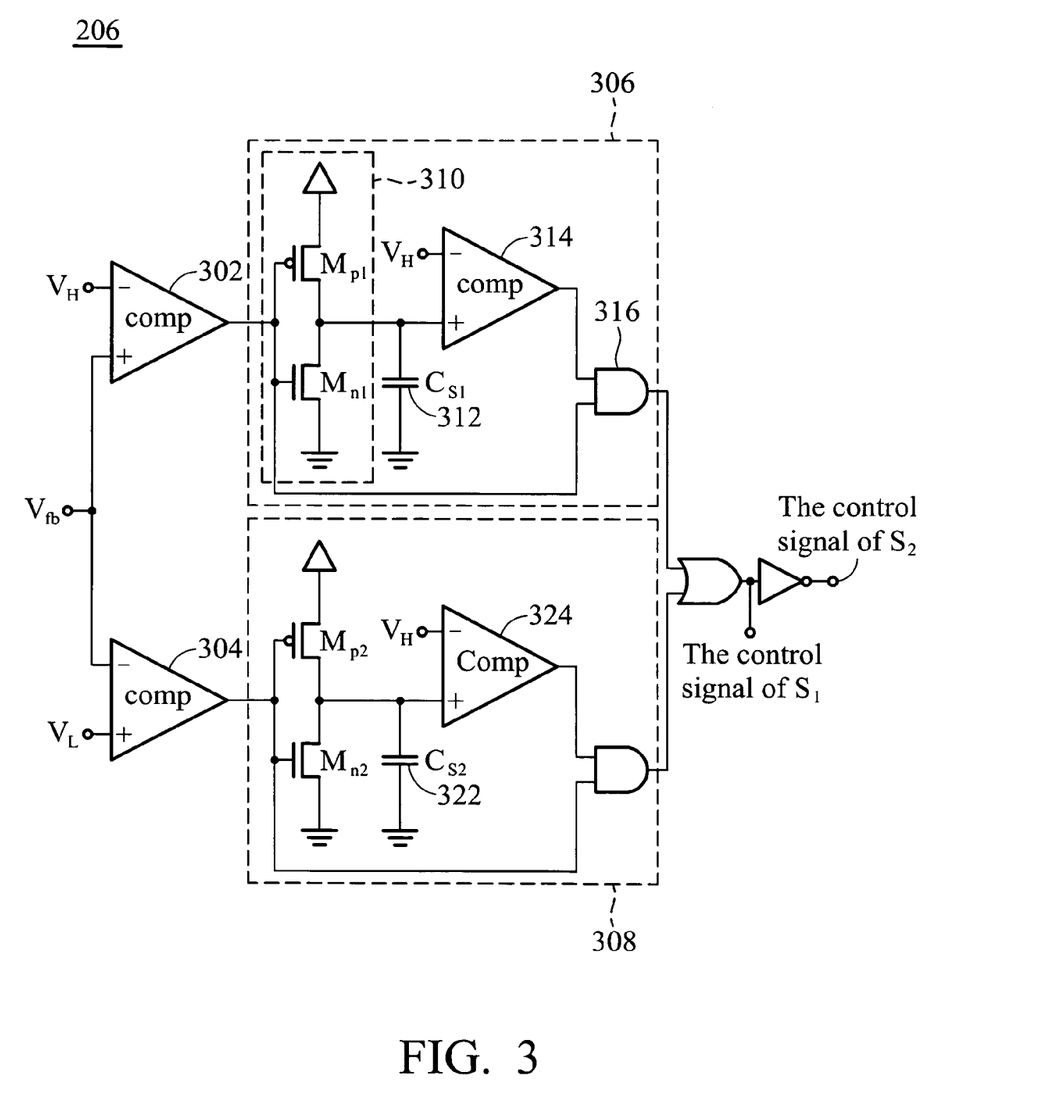
FIG. 3 shows an embodiment of a fast transient controller of the invention.

FIG. 3 shows an embodiment of a fast transient controller of the invention. The fast transient controller 206 further comprises a first comparator 302, a second comparator 304, a first single pulse generator 306, and a second single pulse generator 308. As an example, the fast transient controller 306 can further comprise a CMOS inverter 310, a capacitor 312, a comparator 314, and a AND logic gate 316. The CMOS inverter 310 charges/discharges the capacitor 312 according to the output of the first comparator 302. When the feedback voltage $V_{fb}$ exceeds the high voltage level $V_H$ and the voltage across the capacitor 312 exceeds the voltage at the inverting input terminal of the comparator 314 (as shown in FIG. 3, the inverting input terminal of the comparator 314 is set as the high voltage level $V_H$), the first single pulse generator 306 generates a single pulse (logic '1') to switch on the first switch $S_1$ and switch off the second switch $S_2$. The Miller circuit 208 is switched to the second mode.

Similarly, when the feedback voltage $V_{fb}$ is lower than the low voltage level $V_L$ and the voltage across the capacitor 322 exceeds the voltage at the inverting input terminal of the comparator 324 (as shown in FIG. 3, the inverting input terminal of the comparator 324 is set as the high voltage level $V_H$), the second single pulse generator 308 generates a single pulse (logic '1') to switch on the first switch $S_1$ and switch off the second switch $S_2$. The Miller circuit 208 is switched to the second mode.

Figure 4:
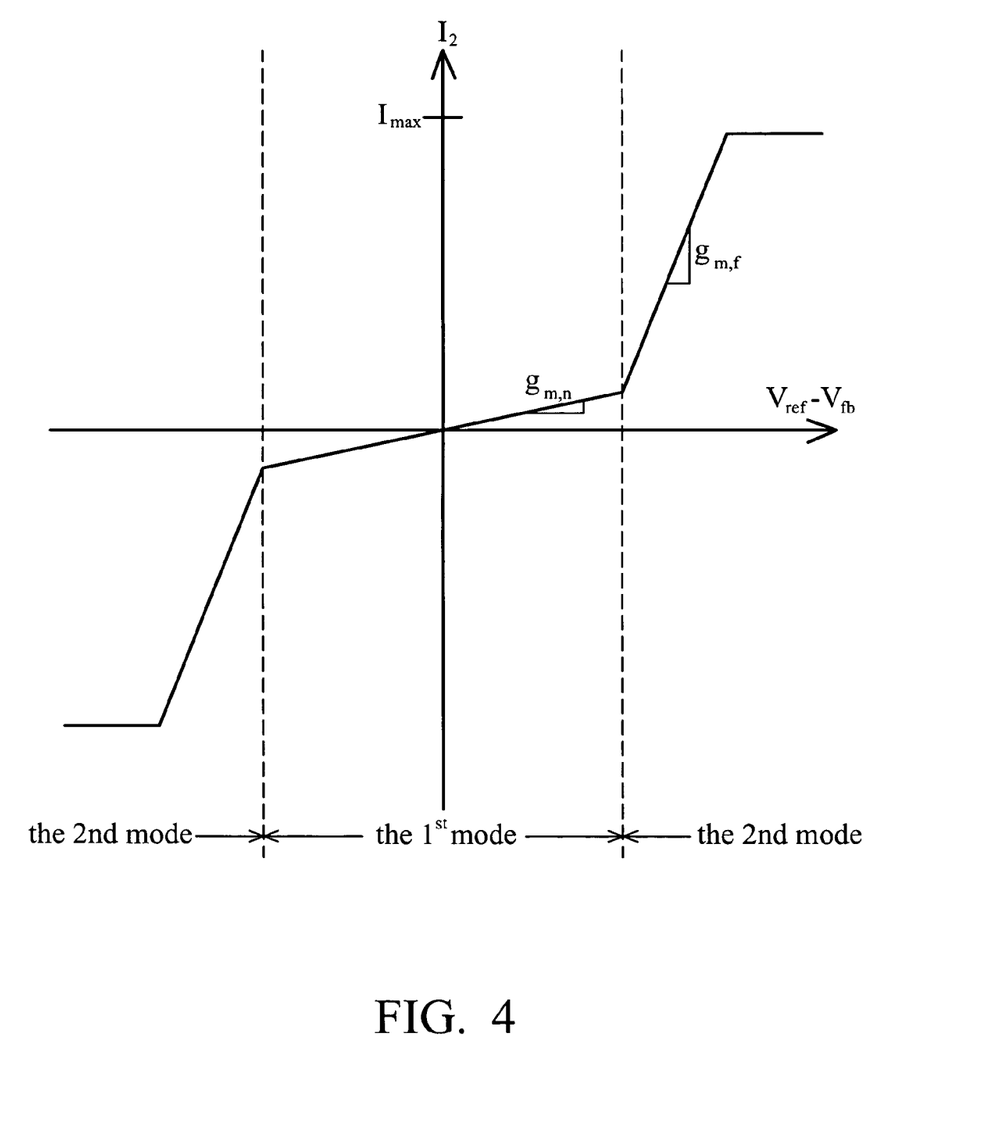
FIG. 4 shows the relationship between a second current $I_2$ and an input voltage of the OTA 202 ($V_{ref}$-$V_{fb}$)

FIG. 4 shows a relationship between the second current $I_2$ and the input voltage of the OTA 202 ($V_{ref}-V_{fb}$). When the Miller circuit 208 is in the first mode, the transconductance between the second current $I_2$ and the voltage difference ($V_{ref}-V_{fb}$) is $g_{m,n}$. When the Miller circuit 208 is in the second mode, the transconductance between the second current $I_2$ and the voltage difference ($V_{ref}-V_{fb}$) is $g_{m,f}$. $g_{m,f}$ is (1+mk) times $g_{m,n}$.

Figure 5:
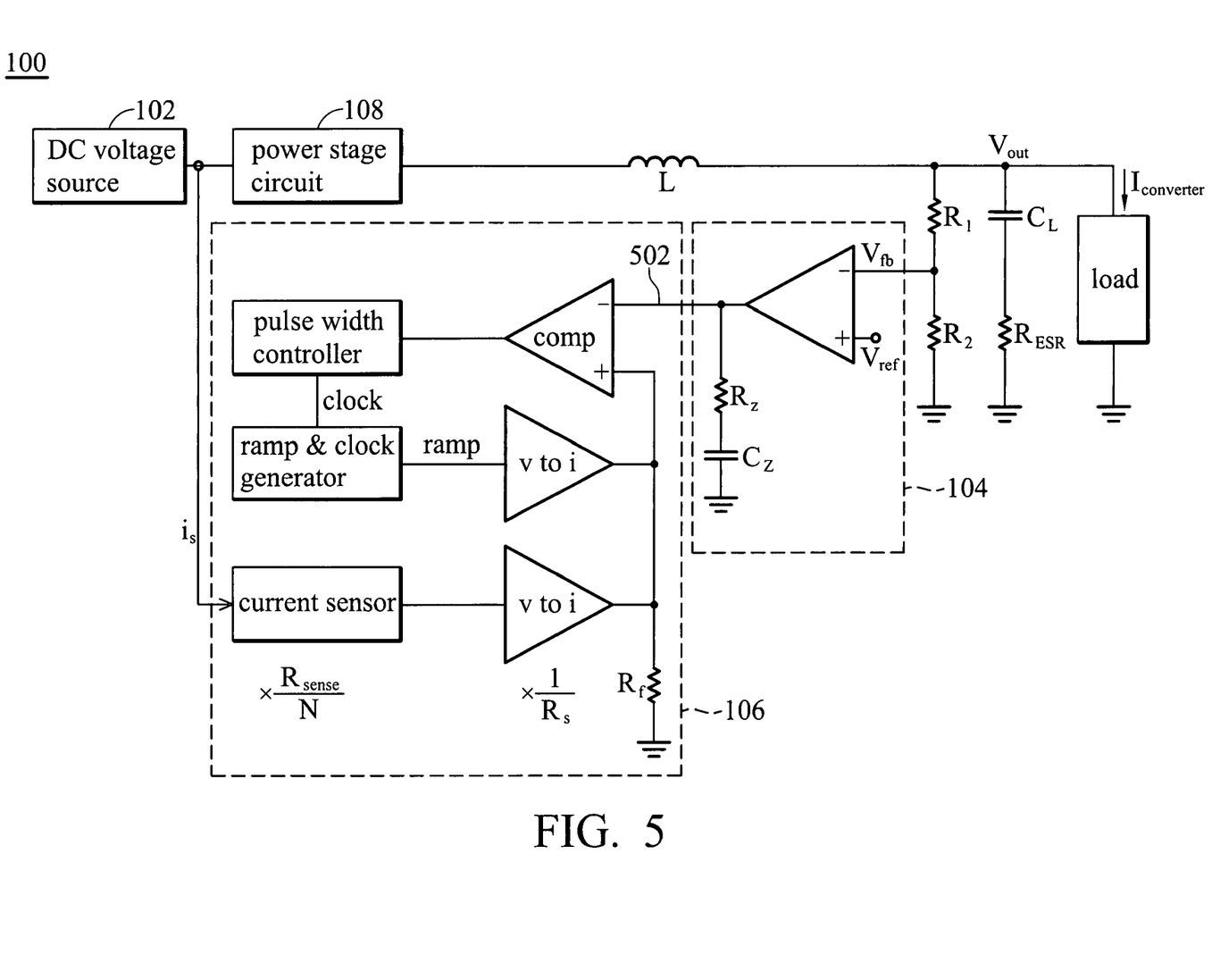
FIG. 5 shows the DC-DC converter of FIG. 1 in another representation.
Figure 6A:
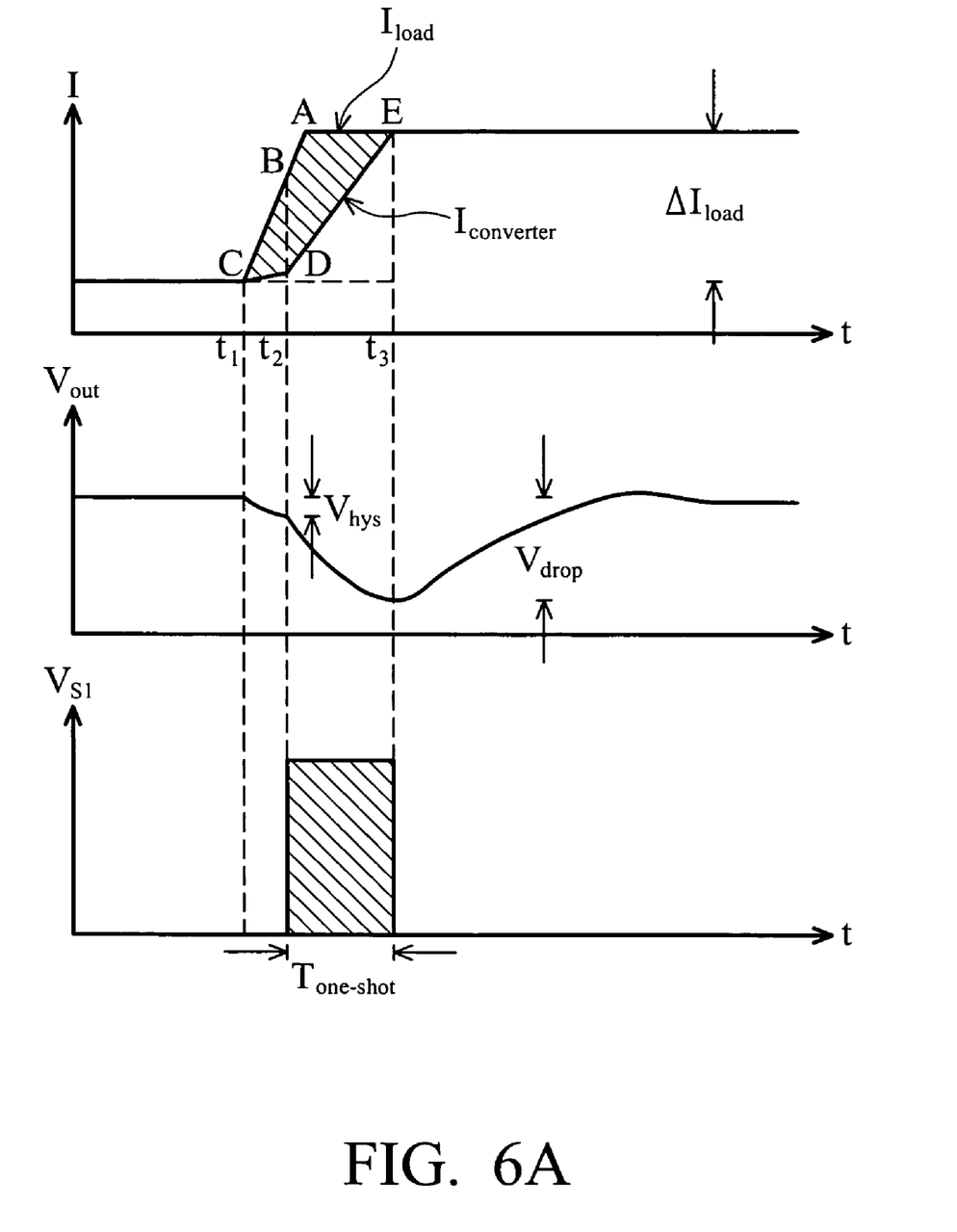
FIG. 6A illustrates operation of the DC-DC converter of FIG. 5 when the load current increases suddenly.
Figure 6B:
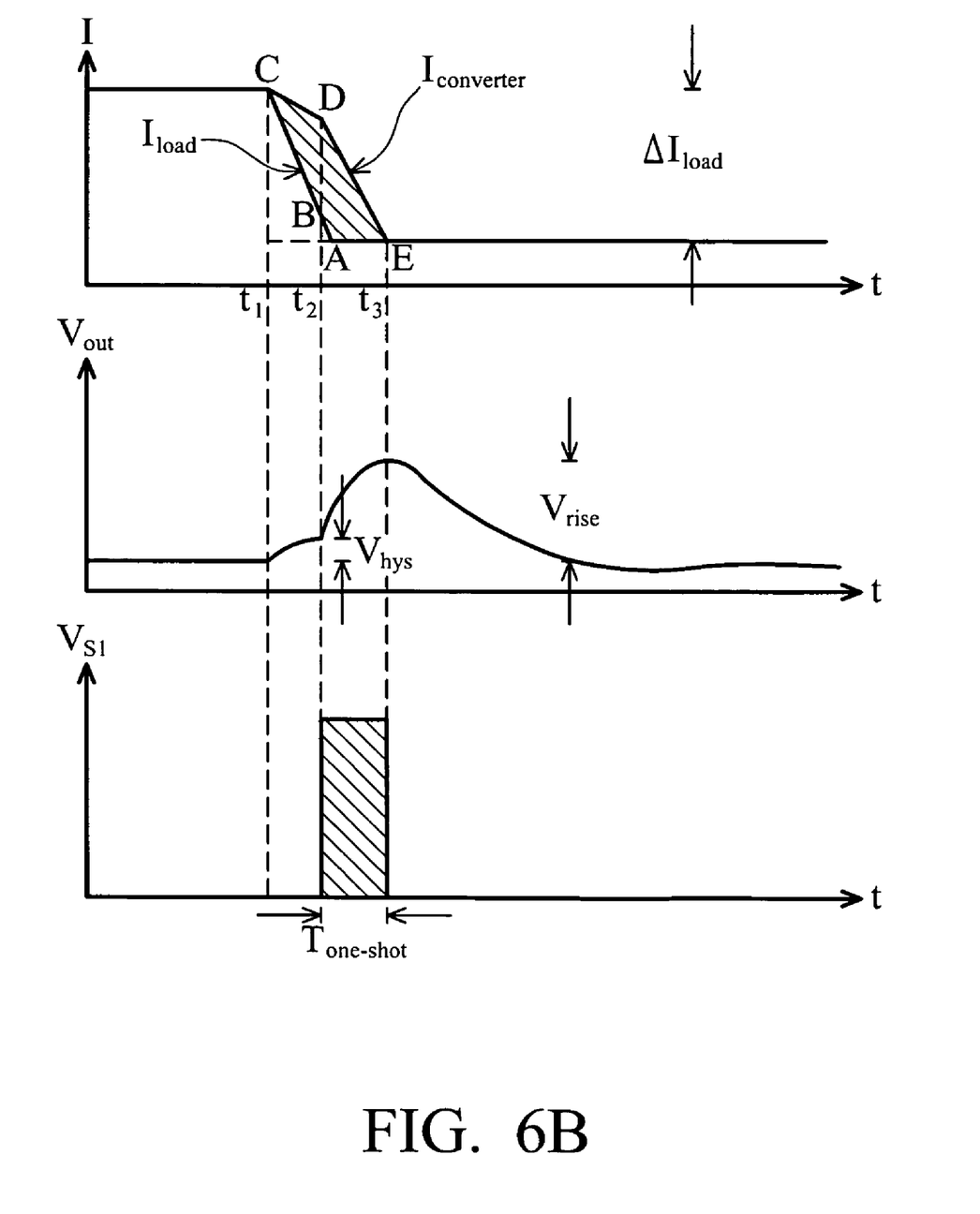
FIG. 6B illustrates operation of the DC-DC converter of FIG. 5 when the load current decreases suddenly.

FIG. 5 shows the DC-DC converter of FIG. 1 in another representation. FIG. 6A and FIG. 6B illustrate operation of the DC-DC converter of FIG. 5. As shown in FIG. 6A, the load current $I_{load}$ increases suddenly, but the current actually provided by the DC-DC converter 100 ($I_{converter}$) is insufficient to supply to the load. The electrical charge of the output capacitor $C_L$, therefore, is provided to the load and the output voltage of the DC-DC converter ($V_{out}$) drops. When the variation of $V_{out}$ exceeds a threshold voltage $V_{hys}$, the Miller circuit 208 of the error amplifier 104 is switched to the second mode (from $t_2$ to $t_3$). The first switch $S_1$ is on and the second switch $S_2$ is off. The Miler circuit 208 is in the second mode for a period of $T_{one-shot}$ to increase $I_{converter}$ to $I_{load}$. After increasing $I_{converter}$ to the value of $I_{load}$, the Miller circuit 208 is switched to the first mode to compensate the output capacitor $C_L$ for the consumed electrical charge. The output voltage of the DC-DC converter ($V_{out}$) is returned to a stable value.

As shown in FIG. 6B, the load current $I_{load}$ decreases suddenly, but the current actually provided by the DC-DC converter 100 ($I_{converter}$) is much higher than the load current $I_{load}$. The output capacitor $C_L$, therefore, is charged with the redundant electrical charges, and the output voltage of the DC-DC converter ($V_{out}$) rises. When the variation of $V_{out}$ exceeds a threshold voltage $V_{hys}$, the Miller circuit 208 of the error amplifier 104 is switched to the second mode (during the period from $t_2$ to $t_3$). The first switch $S_1$ is on and the second switch $S_2$ is off. The Miler circuit 208 is operated in the second mode for a period of $T_{one-shot}$ and to decrease $I_{converter}$ to $I_{load}$. After decreasing $I_{converter}$ to the value of $I_{load}$, the Miller circuit 208 is switched to the first mode to discharge the output capacitor $C_L$ to return the output voltage of the DC-DC converter ($V_{out}$) to a stable value.

$T_{one-shot}$ is evaluated via the following formula:

$$T_{one-shot} = \frac{2C_Z \Delta V_{control}(R_1+R_2)}{g_{m,n}(1+mk) \cdot (\Delta V_{out-max} + V_{hys})R_2},$$

where $\Delta V_{control}$ is the variation of the output voltage of the OTA 104 during the second mode, and $\Delta V_{out-max}$ is the maximum variation of $V_{out}$ ($V_{drop}$ in FIG. 6A and $V_{rise}$ in FIG. 6B). The fast transient controller 206, satisfying the formula, thus reduces the oscillation of $V_{out}$ after time $t_3$.

Figure 7:
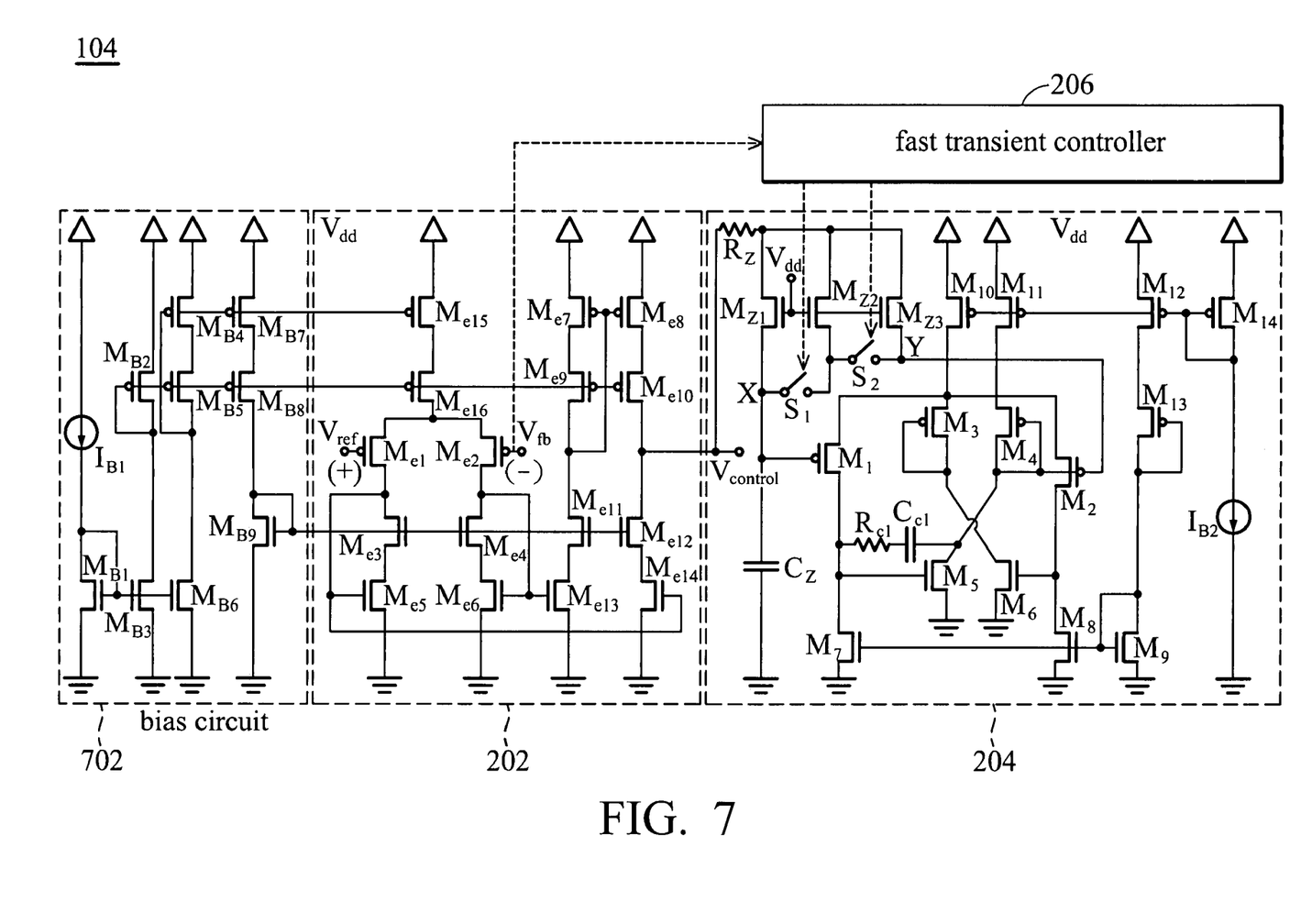
FIG. 7 shows another embodiment of an error amplifier of the invention.

FIG. 7 shows an embodiment of the error amplifier 104. The OTA 202 is biased by a bias circuit 702. The components shown in FIG. 2 can correspond to the components shown in FIG. 7.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. An error amplifier comprising:
   an operational transconductance amplifier, generating a first current according to the voltage difference between a reference voltage and a feedback voltage;
   a compensation circuit, comprising a compensation resistor, a compensation capacitor, and a Miller circuit operated in a first mode or a second mode, wherein the first terminal of the compensation resistor is coupled to the output terminal of the operational transconductance amplifier, the first and second terminals of the Miller circuit are respectively coupled to the second terminal of the compensation resistor and the first terminal of the compensation capacitor, the capacitance of the compensation capacitor charged or discharged by a second current is $C_Z$, the equivalent capacitance generated by the Miller circuit and the compensation capacitance is $(1+k)C_Z$ where k is a positive constant value determined by the Miller circuit, the second current in the second mode is (1+mk) times that in the first mode where m is a positive decimal fraction determined by the Miller circuit; and
   a fast transient controller, switching the Miller circuit to the second mode when the feedback voltage exceeds a high voltage level or is below a low voltage level, otherwise the Miller circuit is set in the first mode.

2. The error amplifier as claimed in claim 1, wherein the Miller circuit comprises a first transistor, a second transistor, a third transistor, a first switch, a second switch, and a voltage follower; wherein the first, second and third transistors are operated in a triode region, the first terminals of the first, second and third transistors are all coupled to the second terminal of the compensation resistor, the first and second terminals of the first switch are respectively coupled to the second terminal of the first transistor and the second terminal of the second transistor, the first and second terminals of the second switch are respectively coupled to the second terminal of the second transistor and the second terminal of the third transistor, the first terminal of the voltage follower is coupled to the first terminal of the first switch 1 and the first terminal of the compensation capacitor, and the second terminal of the voltage follower is coupled to the second terminal of the second switch; wherein the first and second terminals of the voltage follower are kept at the same voltage level, and the ratio of the current through the first, second and third transistors is 1:mk:(1−m)k; wherein the first switch is switched off and second switch is switched on when the Miller circuit is operated in the first mode, and the first switch is switched on and the second switch is switched off when the Miller circuit is operated in the second mode.

3. The error amplifier as claimed in claim 1, wherein the Miller circuit further comprises a first resistor, a second resistor, a third resistor, a first switch, a second switch, and a voltage follower; wherein the first terminals of the first, second and third resistors are all coupled to the second terminal of the compensation resistor, the first and second terminals of the first switch are respectively coupled to the second terminal of the first resistor and the second terminal of the second resistor, the first and second terminals of the second switch are respectively coupled to the second terminal of the second resistor and the second terminal of the third resistor, the first terminal of the voltage follower is coupled to the first terminal of the first switch and the first terminal of the compensation capacitor, the second terminal of the voltage follower is coupled to the second terminal of the second switch, the first and second terminals of the voltage follower are kept at the same voltage level, and the ratio of the current through the first, second and third resistors is $1:mk:(1-m)k$; wherein the first switch is switched off and second switch is switched on when the Miller circuit is operated in the first mode, and the first switch is switched on and the second switch is switched off when the Miller circuit is operated in the second mode.

4. The error amplifier as claimed in claim 2, wherein the fast transient controller further comprises a first comparator, a second comparator, a first single pulse generator, and a second single pulse generator;

wherein the first single pulse generator generates a single pulse to switch on the first switch and switch off the second switch when the first comparator detects that the feedback voltage exceeds the high voltage level;

wherein the second single pulse generator generates a single pulse to switch on the first switch and switch off the second switch when the second comparator detects that the feedback voltage is below the low voltage level;

otherwise the first switch is set to off and the second switch is set to on.

5. The error amplifier as claimed in claim 4, wherein the first and second pulse generators each further comprise a CMOS inverter, a capacitor, a comparator, and a AND logic gate, wherein the input terminal of the CMOS inverter is coupled to the input terminal of the AND logic gate, the capacitor is coupled to the non-inverting input terminal of the comparator and is charged or discharged via the output terminal of the CMOS inverter, and the output terminal of the comparator is coupled to another input terminal of the AND logic gate; wherein the single pulse is generated at the output terminal of the AND logic gate when the input of the CMOS inverter is at logic 1 and the voltage level across the capacitor exceeds the voltage level of the inverting input terminal of the comparator.

6. The error amplifier as claimed in claim 1, wherein the compensation capacitor is on-chip.

7. A DC-DC converter, comprising:
a DC voltage source;
an output capacitor, coupled to the output terminal of the DC-DC converter;
an error amplifier, comprising:
an operational transconductance amplifier, generating a first current according to the voltage difference between a reference voltage and a feedback voltage, wherein the feedback voltage is dependent on the output voltage of the DC-DC converter;
a compensation circuit, comprising a compensation resistor, a compensation capacitor, and a Miller circuit operated in a first mode or a second mode, wherein the first terminal of the compensation resistor is coupled to the output terminal of the opera-
tional transconductance amplifier, the first and second terminals of the Miller circuit are respectively coupled to the second terminal of the compensation resistor and the first terminal of the compensation capacitor, the capacitance of the compensation capacitor charged or discharged by a second current is $C_z$, the equivalent capacitance generated by the Miller circuit and the compensation capacitance is $(1+k)C_z$ where k is a positive constant value determined by the Miller circuit, the second current in the second mode is $(1+mk)$ times that in the first mode where m is a positive decimal fraction determined by the Miller circuit; and
a fast transient controller, switching the Miller circuit to the second mode when the feedback voltage exceeds a high voltage level or falls below a low voltage level, otherwise the Miller circuit is set in the first mode;
a pulse generator, generating a pulse signal according to the voltage level of the output terminal of the operational transconductance amplifier; and
a power stage circuit, coupled to the DC voltage source and the output capacitor, and charging or discharging the output capacitor according to the pulse signal to maintain the output voltage level of the DC-DC converter at a stable value.

8. The DC-DC converter as claimed in claim 7, wherein the Miller circuit comprises a first transistor, a second transistor, a third transistor, a first switch, a second switch, and a voltage follower; wherein the first, second and third transistors are operated in a triode region, the first terminals of the first, second and third transistors are all coupled to the second terminal of the compensation resistor, the first and second terminals of the first switch are respectively coupled to the second terminal of the first transistor and the second terminal of the second transistor, the first and second terminals of the second switch are respectively coupled to the second terminal of the second transistor and the second terminal of the third transistor, the first terminal of the voltage follower is coupled to the first terminal of the first switch and the first terminal of the compensation capacitor, and the second terminal of the voltage follower is coupled to the second terminal of the second switch; wherein the first and second terminals of the voltage follower are kept at the same voltage level, and the ratio of the current through the first, second and third transistors is $1:mk:(1-m)k$; wherein the first switch is switched off and second switch is switched on when the Miller circuit is operated in the first mode, and the first switch is switched on and the second switch is switched off when the Miller circuit is operated in the second mode.

9. The DC-DC converter as claimed in claim 7, wherein the Miller circuit further comprises a first resistor, a second resistor, a third resistor, a first switch, a second switch, and a voltage follower; wherein the first terminals of the first, second and third resistors are all coupled to the second terminal of the compensation resistor, the first and second terminals of the first switch are respectively coupled to the second terminal of the first resistor and the second terminal of the second resistor, the first and second terminals of the second switch are respectively coupled to the second terminal of the second resistor and the second terminal of the third resistor, the first terminal of the voltage follower is coupled to the first terminal of the first switch and the first terminal of the compensation capacitor, the second terminal of the voltage follower is coupled to the second terminal of the second switch; wherein the first and second terminals of the voltage follower are kept at the same voltage level, and the ratio of the current through the first, second and third resistors is 1:mk:(1−m)k; wherein the first switch is switched off and the second switch is switched on when the Miller circuit is operated in the first mode, and the first switch is switched on and the second switch is switched off when the Miller circuit is operated in the second mode.

10. The DC-DC converter as claimed in claim 8, wherein the fast transient controller further comprises a first comparator, a second comparator, a first single pulse generator, and a second single pulse generator;

wherein the first single pulse generator generates a single pulse to switch on the first switch and switch off the second switch when the first comparator detects that the feedback voltage exceeds the high voltage level;

wherein the second single pulse generator generates a single pulse to switch on the first switch and switch off the second switch when the second comparator detects that the feedback voltage is below the low voltage level;

otherwise the first switch is set to off and the second switch is set to on.

11. The DC-DC converter as claimed in claim 7 further comprises a first voltage-dividing resistor $R_1$ and a second voltage-dividing resistor $R_2$, wherein the DC-DC converter provides an output voltage of $V_{out}$, the maximum variation of $V_{out}$ is $\Delta V_{out-max}$, the feedback voltage $$V_{fb} \text{ is } \frac{R_2}{R_1+R_2} \cdot V_{out},$$

the Miller circuit switches from the first mode to the second mode when the variation of the output voltage of the DC-DC converter exceeds a threshold voltage of $V_{hys}$, and the Miller circuit is maintained in the second mode for a period of $T_{one-shot}$, where $$T_{one-shot} = \frac{2C_Z \Delta V_{control}(R_1+R_2)}{g_{m,n}(1+mk) \cdot (\Delta V_{out-max}+V_{hys})R_2},$$

where in the first mode, the transconducrance generated by the second current and the voltage difference between the reference and the feedback voltages is $g_{m,n}$, and during the second mode, the variation of the output voltage of the operational transconductance amplifier is $\Delta V_{control}$.

12. The DC-DC converter as claimed in claim 7, wherein the compensation capacitor is on-chip.

* * * * *